Dec. 16, 1969    W. F. PORTER    3,484,222
METHOD AND APPARATUS FOR DISTRIBUTING MOLTEN
MATERIAL ONTO A SPINNER SURFACE
Filed Feb. 27, 1967    2 Sheets-Sheet 1
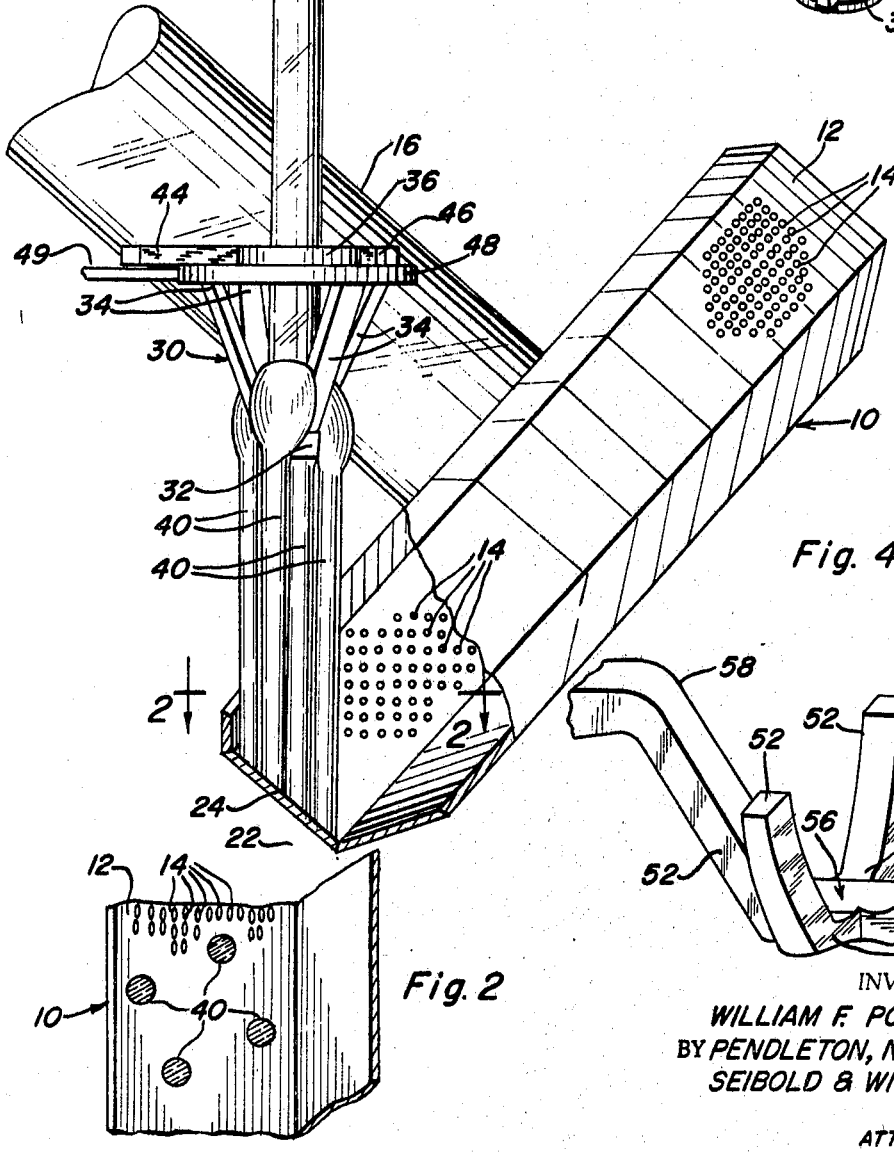
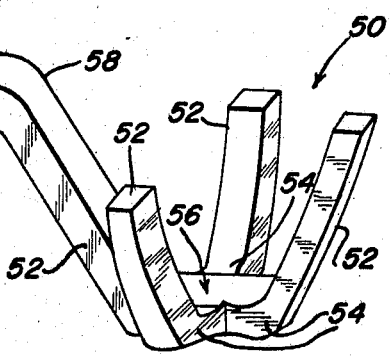
INVENTOR.
WILLIAM F. PORTER
BY PENDLETON, NEUMAN
SEIBOLD & WILLIAMS
ATTORNEYS Dec. 16, 1969   W. F. PORTER   3,484,222
METHOD AND APPARATUS FOR DISTRIBUTING MOLTEN
MATERIAL ONTO A SPINNER SURFACE
Filed Feb. 27, 1967   2 Sheets-Sheet 2

INVENTOR.
WILLIAM F. PORTER
BY PENDLETON, NEUMAN
SEIBOLD & WILLIAMS
ATTORNEYS

United States Patent Office 3,484,222
Patented Dec. 16, 1969

3,484,222
METHOD AND APPARATUS FOR DISTRIBUTING MOLTEN MATERIAL ONTO A SPINNER SURFACE
William F. Porter, Hoffman Estates, Ill., assignor to United States Gypsum Company, Chicago, Ill., a corporation of Delaware
Filed Feb. 27, 1967, Ser. No. 618,898
Int. Cl. C03b 37/04
U.S. Cl. 65—2                                    11 Claims

ABSTRACT OF THE DISCLOSURE

A stream of molten glass from any suitable source falls into a distributor having a bottom and a plurality of spaced posts extending upwardly from the bottom adjacent the periphery thereof. The posts and bottom define outlet openings about the periphery of the distributor for discharging a plurality of spaced discrete streamlets of molten glass to the inner surface of the perforate band of a spinner positioned below the distributor and rotatable about an inclined shaft. The distributor is oriented to obtain the desired distribution of the streamlets over the width of the perforate band, and may be vertically and rotationally adjusted to control the temperature of the glass delivered to the spinner, and to vary the positioning of the streamlets on the perforate band.

CROSS-REFERENCE TO RELATED APPLICATION

This application pertains to improvements in the feeding of molten glass to a fiberizing spinner utilizing the advantages of supplying the molten glass in a plurality of streamlets as broadly disclosed in the copending application of Peter Erdenberger, Ser. No. 464,274, filed June 16, 1965, now U.S. Pat. No. 3,387,960.

BACKGROUND OF THE INVENTION

Field of the invention

This invention relates to spinning glass fibers and more particularly relates to methods and apparatus for distributing molten glass on a perforate rim of a rapidly rotating spinner and controlling the temperature of the glass.

Description of the prior art

In the manufacture of glass fibers or filaments it is well known to provide a source of molten glass and to direct the molten glass to the interior of a rapidly rotating spinner. Centrifugal force causes the melt to flow through orifices in the rim of the spinner and thereafter be attenuated or processed in many ways to form fibers. As each orifice on the rim of the spinner serves as a source for but one fiber at a time, a large number of such orifices must be provided to obtain economical production. Several thousand orifices may be arranged in multiple rows, e.g., 20 rows, extending in a wide band around the rim of the spinner.

Proper distribution of the molten glass over the perforate band of a spinner is important to satisfactory fiberizing operations. For instance, to operate at maximum efficiency molten glass must be supplied to all the orifices. Obviously, "dry" orifices produce no fibers. Also, a large portion of the heat supplied to the fiberizing spinner is conveyed to it by the molten glass. Thus, the spinner may be subjected to strong localized heating, and may be heated to excessive temperatures in local areas if the molten glass is not properly distributed. Since the temperature of the spinner is critical to the length of its useful life, such excessive temperatures can be very detrimental. Further, the temperature of the rotor at an orifice also exerts considerable influence on the amount and size of fibers produced at that orifice.

Control of the temperature of a glass entering a spinner is also important. The temperature of the glass determines its viscosity which in turn influences the diameter of the fibers formed in a fiberizing operation. Further, the temperature of the glass affects the temperature of the spinner and thus affects useful spinner life as indicated above.

Distribution systems developed in the art prior to the above-mentioned Erdenberger invention have included various arrangements for flowing a stream of the molten glass onto or over the inner surface of the perforate band of the spinner. However, these arrangements have presented various shortcomings due in large measure to inadequate control over the distribution of the melt across the perforate band.

To relieve the difficulties caused by this lack of control of the melt distribution on the spinner wall, a number of types of rotary distributors have been developed which are located within the fiberizing spinner and which revolve about the same axis as the spinner, usually revolving in unison with the spinner. With this arrangement, the streams from the distributor continuously strike the same spots or areas of the spinner rim or wall resulting in greater wear and deterioration in such areas.

The aforementioned Erdenberger application discloses a manner of feeding the melt which overcomes several of the aforenoted difficulties by forming a plurality of supply streamlets and directing these streamlets onto the perforate band of a spinner in a predetermined pattern.

SUMMARY OF THE INVENTION

It is an object of this invention to provide improved means and methods for distributing molten glass in a spinner utilizing the advantages of the aforementioned Erdenberger teachings and providing further advantages by way of increased adaptability and flexibility of the distribution system, improved control of the distribution of the glass on the spinner wall and improved control of the temperature of the glass entering the spinner. Thus, it is an object of this invention to provide improved distribution of molten glass over the interior surface of a perforate band of a fiberizing spinner. It is a further object of this invention to provide improved control of the temperature of molten glass supplied to a fiberizing spinner. It is a still further object of this invention to provide a simple inexpensive arrangement for controlling and readily varying the distribution of molten glass over a wide peripheral band of a fiberizing spinner.

In general the foregoing objects are achieved by locating a distributor element intermediate a source of a stream of molten glass and a fiberizing spinner having a perforate peripheral wall with an upwardly exposed inner surface. The distributor intercepts the glass stream and includes divider bars which divide the flowing glass into discrete spaced streamlets. These streamlets are directed to adjacent bands or areas on the interior surface of the perforate spinner wall in such patterns as to effect the desired distribution across the perforate band. By virtue of their greater surface area per unit of volume relative to the incident stream of glass, the streamlets radiate heat at a higher rate than the stream. By adjusting the position of the distributor to vary the length of the incident stream relative to the length of the streamlets flowing from the distributor, a previously unobtainable measure of temperature control at the spinner may be achieved. The distributor also may be horizontally and rotationally adjustable to effect the desired stream patterns on the perforate band.

For a more complete understanding of this invention reference should now be had to the drawings wherein cer-

BRIEF DESCRIPTION OF THE DRAWINGS

FIG. 1 is a side elevation view, partly in section, of a fiberizing apparatus employing teachings of this invention;

FIG. 2 is a partial view taken on line 2—2 of FIG. 1 and illustrating the pattern of distribution of the streamlets on the perforate band of the spinner;

FIG. 3 is a perspective view of the distributor shown in FIG. 1;

FIG. 4 is a perspective view of another embodiment of a stream distributor employing teachings of this invention;

DESCRIPTION

Figure 8:
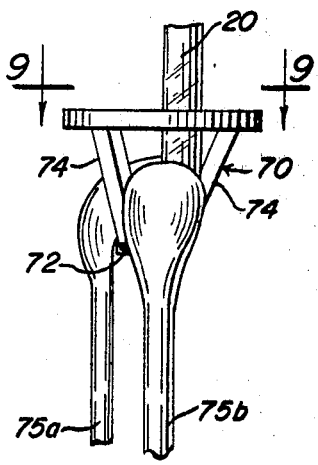
FIG. 8 is a side elevation view of another distributor arrangement employing teachings of this invention.

Referring to FIG. 1 of the drawings, there is indicated generally a spinner 10 having a sidewall 12 formed with a band of fiber-forming orifices, as shown schematically at 14. The spinner is secured to a shaft 16, e.g., inclined at about 40° to the horizontal, and is adapted for rotation at high speeds, e.g., 2000 r.p.m., by conventional means, not shown. A stream of molten glass 20 is supplied from a source 18 such as a furnace or forehearth through a bushing 19 above the spinner. The bushing 19 is located so that the extended axis 22 of the molten stream intersects the rotor near the mid-point 24 of the upwardly exposed inner surface of the perforate band.

A stream divider or distributor indicated generally by the number 30 is located to intercept the stream of molten glass 20. The distributor 30 is generally of a cage or basket construction, see also FIG. 3, and comprises a deflector plate element or base 32 with stream divider bars 34 extending upwardly from the base to a ring 36. The bars are uniformly spaced about deflector plate 32 and ring 36, and are welded to the outer periphery of plate 32 and to the underside of ring 36.

By way of illustration, four divider bars 34 are shown in both FIGS. 1 and 3, but their numbers may be varied in accordance with conditions of operation. Generally, three to six bars may be used, depending to a certain extent upon the rate at which the molten glass is flowing to the spinner, its viscosity and other variables. A relatively few bars will result in a corresponding lesser number of streamlets 40, which may be desirable to avoid too much cooling of the glass at lower flow rates. Also, when larger streamlets are formed it has been noted that their paths tend to be more stable in the presence of vibrations, air currents or other disturbing influences.

The distributor may be supported by any suitable means and is preferably adjustable vertically, horizontally, and rotationally. By way of example, as illustrated in FIGS. 1 and 3, three radial support ears 42, 44 and 46 are provided on rings 36 for supporting the distributor on a surrounding annular support 48. The ears rest upon the upper surface of support 48. By engaging one of the ears, such as extended ear 44, rotational adjustment of the distributor within support 48 may be effected to obtain the desired angular orientation of the distributor about axis 22. A support arm 49 is provided on the annular support 48. Arm 49 may be secured to any suitable support, as by adjustable securement to a post extending parallel to the axis 22. In one convenient arrangement, the arm 49 is supported in a crosshead device, similar to those used in machine tools, to conveniently effect accurate positioning of the distributor vertically and horizontally.

When the apparatus of FIG. 1 is in operation, molten glass supplied from the source 18 in a stream 20 falls freely along the substantially vertical axis 22. The viscous molten glass impinges on the deflector bottom 32, builds up a head thereon, and flows divergently toward the margins of the deflector. The divider bars 34 divide this divergent flow and cause the viscous melt to be discharged between the bars 34 as discrete spaced streamlets 40 which drop to the spinner along separate spaced paths substantially parallel to the axis of the original stream 20.

The horizontal dimensions of the deflector between the edges or lips over which the streamlets are discharged are such that the falling streamlets will impinge on the inner surface of the perforate peripheral wall 12 of the spinner. In the apparatus of FIG. 1, this requires that the group of parallel streamlets be within the projection of the width of the bottom portion of the perforate band on a horizontal plane. There is some tendency of the streamlets to neck-in beneath the discharge lips. Accordingly, the horizontal dimension of the deflector at the discharge lips, measured parallel to a vertical plane through the rotor axis, may approximate or be only slightly less than the corresponding horizontal dimension of the target area.

The distributor is angularly (rotationally) oriented to obtain the desired distribution of the glass over the width of the perforate band. For instance, in one preferred arrangement a distributor 30 having equal discharge openings uniformly spaced therearound to provide substantially uniform streamlets is oriented to drop the spaced streamlets in a staggered pattern such as that shown in FIG. 2, whereby the streamlets are evenly distributed across the width of the band. Depending on the width of the pattern, the number of streamlets and the flow rate, the streamlets may be spaced from one another as viewed in a side elevation view, see FIG. 1, or, in many instances, will be in apparent edge-overlapping relation when thus viewed.

The position of the distributor in a horizontal plane, relative to the stream axis 22, affects the relative flow rate in the various streamlets. For instance, by positioning the distributor so that stream 20 impinges over plate 32 nearer to one discharge slot than to the other slots, a greater flow rate will be obtained in the streamlet from the nearer slot than in each of the streamlets from a remote slot. This phenomenon may be used for controlling the relative amounts of molten glass fed to different areas of the perforate band, and is discussed further below with specific reference to FIGS. 8–10.

One configuration of a distributor 50 without an upper support ring is illustrated in FIG. 4, in which it will be noted that the divider bars 52 are formed of comparatively sturdy bar stock. Extensions 54 of the bars are united to form a central stream deflector portion 56. A further extension 58 of one stream divider bar 52 may serve as a mounting member by which the distributor may be secured in operative position.

Figure 5:
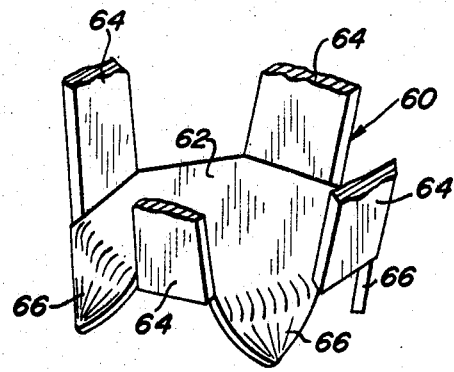
FIG. 5 is an enlarged partial perspective view of another stream distributor employing teachings of this invention, with the upper portion broken away.

FIG. 5 is a partial enlarged view of another embodiment of a distributor 60 which may be made from a unitary flat blank of stainless steel. Distributor 60 includes a central deflector bottom portion 62 and integral upturned divider bars 64. The divider bars 64 may be joined to a support ring at their upper ends, as in FIGS. 1 and 3, or this ring may be omitted if desired, as in FIG. 4. Streamlet directing tabs 66 are bent downward, there being a tab 66 at each discharge opening between adjacent bars 64. These tabs preferably are generally triangular as shown in FIG. 5. The tabs 66 stabilize the points of departure of the streams and guard against joinder of adjacent streams as by the streams flowing along an edge or surface of plate 32. Of course, the tabs may be formed as separate elements and then be secured to the deflector, as by welding.

Figure 9:
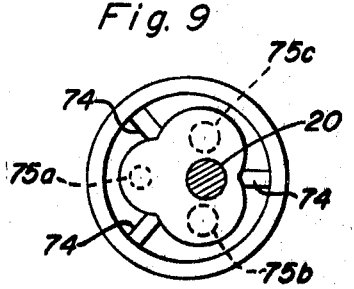
FIG. 9 is a cross-sectional view taken on line 9—9 of FIG. 8.
Figure 10:
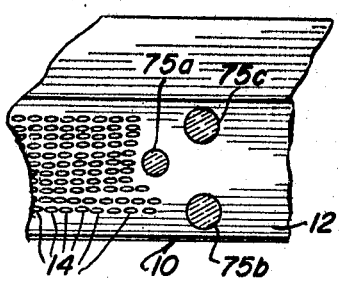
FIG. 10 is a partial cross-sectional view similar to FIG. 2, illustrating the pattern of distribution of the streamlets on a perforate band of a spinner by the distributor arrangement of FIGS. 8 and 9.

FIGS. 8-10 illustrate a particular advantageous unbalanced feeding arrangement utilizing a distributor 70 with three divider bars 74 and three outlet slots. The distributor 70 is angularly oriented so that one slot directs a streamlet 75a to the center of the perforate band 12 and the other two slots direct streamlets 75b and 75c to each edge portion of the band. By positioning the distributor horizontally, so that the stream 20 impinges over the deflector base 72 nearer the outer streamlet forming slots than to the center streamlet slot, as illustrated in FIG. 9, more glass will be discharged in the outer streamlets 75b and 75c than in the center streamlet 75a. This variation may be used to supply more glass and thus more heat to the edge portions of the perforate band 12 than to the center portion of the band, see FIG. 10, to compensate for the higher rate of heat dissipation normally experienced at the edge portions as compared to the center portion.

Figure 6:
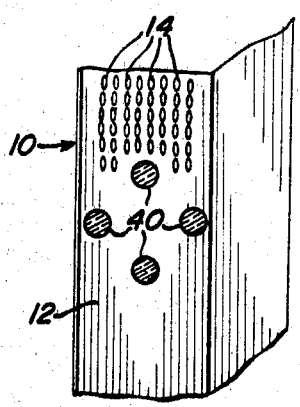
FIGS. 6 and 7 are views similar to FIG. 2 illustrating other patterns of distribution of the streamlets on the perforate band of the spinner.
Figure 7:
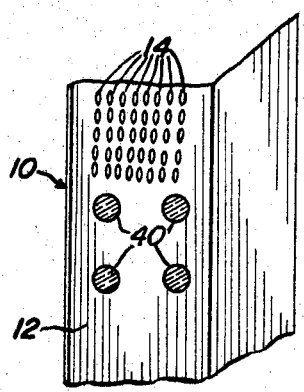

Controlled unbalanced feeding also may be obtained by angularly adjusting the distributor about axis 22. For instance, with four streamlets as in FIG. 1, one extreme position of the distributor 30 is with two streamlets aligned at the center of the band 12 and one streamlet on either side as in FIG. 6, the other extreme being with two streamlets aligned at each side of the center as in FIG. 7.

Predetermined patterns of unbalanced feeding also may be obtained by varying the spacing of the bars 34, i.e., varying the width of the outlet openings of the distributor. However, this alternative results in reduced flexibility over the above-mentioned arrangements which rely upon the rotational and horizontal positioning of the distributor for variation.

In the illustrated embodiments, the divider bars diverge upwardly from the deflector to provide greater space between their upstream ends than at the deflector so that as the flow of molten glass 20 increases and the head standing above the deflector base 32 rises, substantially more glass may flow through the space between the bars.

The distributor assists in controlling the effective location of the stream in that, due to the head of molten glass standing within the distributor, substantially constant streamlets will be obtained despite minor wavering of the stream 20. The head of molten glass in the distributor also serves as a small surge tank and thus tends to smooth out any small irregularities which may occur in the rate of flow of the molten glass stream 20.

By way of a more specific example, a distributor 30 of the type illustrated in FIGS. 1 and 3, for use with a spinner having a perforate band 1½" wide, was fabricated of 308 stainless steel, and was 3" in overall height. The deflector plate 32 was 1" in diameter and ¼" thick. Support ring 36 was 3½" O.D. and 2¾" I.D. Four equally spaced divider bars 34 were used, each being ⅜" wide and 3/16" thick. These parts were arc welded together.

Another embodiment, which included tabs, was 2½" in height (excluding the tabs), with a deflector plate 1½" in diameter and ¼" thick. The support ring was 3½" O.D. and 3" I.D. Four evenly spaced divider bars were provided, each being ½" wide, ¼" thick and 2⅜" long. The tabs were generally triangular, being ⅝" wide at the base, ½" long and ⅛" thick. These components were also welded together.

To make high quality fibers, the temperature of the glass at the time it contacts the spinner wall must be controlled very closely. The molten stream 20 cools at a much lower rate than do the streamlets which issue from the stream divider. As will be demonstrated by the following examples, this condition enables the exercise of very close control over the temperature of the glass when it contacts the spinner wall 12.

Example 1.—The apparatus illustrated in FIG. 1 was assembled so that the distance between the bushing 19 and the mid-point 24 of the perforate wall of the spinner therebeneath was 40 inches. The spinner wall had 20 rows of fiber-forming orifices in a band about 1½ inches wide A soda lime boro-silicate glass issued from the bushing 19 at 2005° F., at which temperature it had a viscosity of about 222 poises, at a rate of 550 pounds per hour. A distributor having three divider bars but otherwise similar to that illustrated in FIG. 1 was located 10" below the bushing to form three streamlets. A temperature of 1800° F. was measured at the spinner wall, a reduction of 205° F. from the temperature of the glass at the bushing. When the distributor was removed and the stream of glass 20 fell directly onto the spinner wall, the wall temperature was found to be 1910° F., a reduction of only 95° F. from the temperature of the glass at the bushing.

Example 2.—In this example, the equipment was arranged as in Example 1. Glass issued at a rate of 700 pounds per hour from the bushing at a temperature of 1910° F., at which temperature it had a viscosity of 385 poises. When the glass dropped directly onto the interior of the orificed wall 12 of the spinner, a temperature of 1890° F. was measured on the wall of the spinner. Thus the temperature of the rotor wall as only about 20° F. lower than the temperature of the glass at the bushing. When a 3-bar distributor was located 10" below the bushing, and three streamlets were formed from the glass, the temperature of the spinner wall was 1810° F., a reduction in temperature of 100° F. below the glass temperature at the bushing.

Certain of the distributive advantages of this apparatus also may be illustrated with reference to Example 2 above. The stream from the bushing had a diameter of about ¾", and only 10 to 15 rows of orifices received glass when this stream was dropped directly onto the perforate band. When the distributor was inserted and positioned to space the three streamlets across the width of the perforate band, the streamlets supplied glass to substantially all the rows of orifices and more uniform fibers were produced.

The foregoing examples illustrate the unusually large temperature reduction obtained by this invention relative to the single freely falling stream known to the prior art. If a reduction in temperature of smaller magnitude is desired, it is only necessary to locate the distributor farther from the bushing and nearer the spinner, thus increasing the length of the incident stream relative to the length of the streamlets emerging from the distributor.

It is evident from the foregoing that a simple and improved method has been disclosed for distributing molten glass over the perforate band of a spinner. A distributor apparatus has been provided which is very simple in structure yet which effects the desired objects by dividing a stream of molten glass into multiple spaced streamlets and distributing these streamlets across the perforate band of a fiberizing spinner in a controlled variable pattern. Moreover, by selecting the location of the distributor element relative to the longitudinal axis of this glass stream, it is possible to regulate the temperature of the glass as it is deposited upon the spinner in a greatly improved manner.

While particular embodiments of the invention have been shown and described, it will be understood, of course, that the invention is not limited thereto since modifications may be made by those skilled in the art, particularly in the light of the foregoing teachings.

I claim:
1. Apparatus for use in processing molten mineral material comprising means for supplying such molten material in a freely falling stream, means beneath said supply means for receiving said molten material, and a distributor spaced below said supply means and above said receiving means for dividing such falling stream into a plurality of streamlets, said distributor including deflector means for intercepting such stream and permitting the intercepted material to flow over its peripheral edge por- tions, and a plurality of divider elements disposed about the periphery of said deflector means in spaced relation to one another and extending upwardly therefrom to divide such molten material flowing from said deflector means into a plurality of discrete spaced streamlets and defining, with said deflector means, a plurality of outlet openings along spaced peripheral portions of said deflector means for discharge of such streamlets therefrom, said distributor being open above said deflector means for the passage of such stream to said deflector means.

2. Apparatus according to claim 1 wherein said distributor includes streamlet directing tabs intermediate said divider elements and extending downwardly from said deflector means.

3. Apparatus according to claim 1 wherein said distributor comprises an open cage-like structure wherein each of said divider elements is of a width substantially less than the spacing between adjacent divider elements.

4. Apparatus according to claim 1 wherein said distributor comprises a generally basket-shaped device comprising a substantially solid bottom, an annular top portion of greater diameter than said bottom, and a plurality of equally spaced posts connecting said top to the periphery of said bottom.

5. Apparatus for forming glass fibers comprising a spinner mounted on a shaft disposed at a substantial angle to the vertical and including a perforate peripheral band having the inner surface of the lower portion of such band exposed upwardly, and a stream divider positioned above said upwardly exposed inner surface and comprising a deflector portion for intercepting a descending stream of molten glass material, and stream divider elements extending upwardly from the periphery of said deflector portion and defining therewith a plurality of outlet openings for discharging molten material intercepted by said deflector means in a plurality of discrete spaced streamlets, said divider being open above said deflector portion for the passage of such stream to said deflector portion, whereby such streamlets are directed to said upwardly exposed inner surface in spaced relation to one another in a predetermined pattern.

6. Apparatus as in claim 5 including support means for said stream divider permitting rotation of said divider about a vertical axis passing through said deflector portion for altering said pattern.

7. Apparatus as in claim 5 wherein each of such openings extends along a peripheral portion of said deflector portion angularly displaced with respect to each other such peripheral portion for multidirectional discharge of such streamlets from said deflector portion.

8. Apparatus as in claim 5 including supply means for dropping a supply stream of molten glass material to said stream divider, said divider being positioned to receive such stream eccentrically on said deflector portion.

9. A method of controlling the distribution and the temperature drop of molten glass flowing from a source thereof to the perforate band of a spinner mounted a predetermined distance therebeneath on a shaft disposed at a substantial angle to the vertical with the inner surface of the lower portion of such band exposed upwardly, which comprises flowing the molten glass from said source in a freely falling main stream, dividing said stream into a plurality of freely falling substantially parallel streamlets, directing said streamlets onto said upwardly exposed inner surface in spaced relation to one another in a predetermined pattern, and adjusting the relative lengths of said main stream and said streamlets to control the cooling of said material between said supply and said spinner to achieve a predetermined temperature of said material at said spinner.

10. Apparatus for use in processing molten mineral material comprising means for supplying such molten mineral material in a freely falling stream, means beneath said supply means for receiving said molten material, a stream divider spaced below said supply means and above said receiving means for receiving such molten material from said supply means, for dividing such molten material into a plurality of discrete spaced streamlets to drop such streamlets, in spaced relation to one another, to said receiving means, and means for supporting said stream divider for vertical adjustment along the path of flow of such molten material from said supply means to said receiving means to control the temperature of the molten material at said receiving means.

11. A process of controlling the temperature of molten mineral material at a receiving means therefor which comprises providing a freely falling stream of said material from a source spaced a predetermined distance above said receiving means, dividing said stream into a plurality of streamlets at a point intermediate said distance, said streamlets dissipating heat at a greater rate than said stream, and vertically adjusting the location of said point to control the temperature of said material at said receiving means.

References Cited

UNITED STATES PATENTS 3,387,960  6/1968  Erdenberger _____ 65—15

S. LEON BASHORE, Primary Examiner

ROBERT L. LINDSAY, Jr., Assistant Examiner

U.S. Cl. X.R.

65—8, 12, 15, 121, 133